Jan. 9, 1962   J. W. TATTER   3,016,261
VEHICLE DOORS
Filed Sept. 16, 1959   2 Sheets-Sheet 1
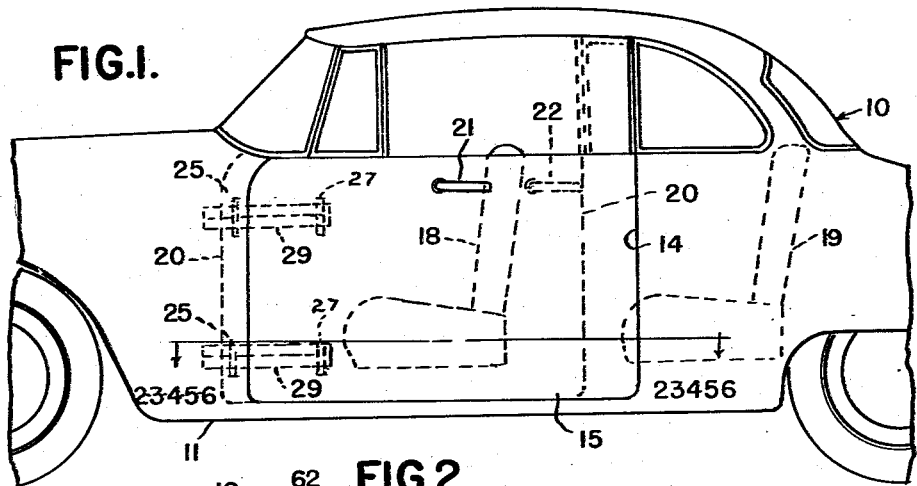
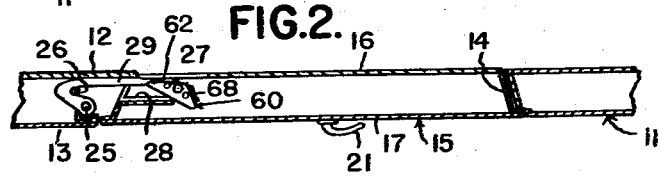
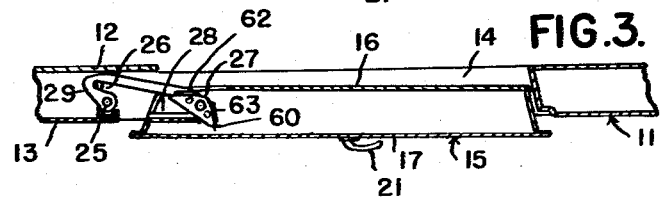
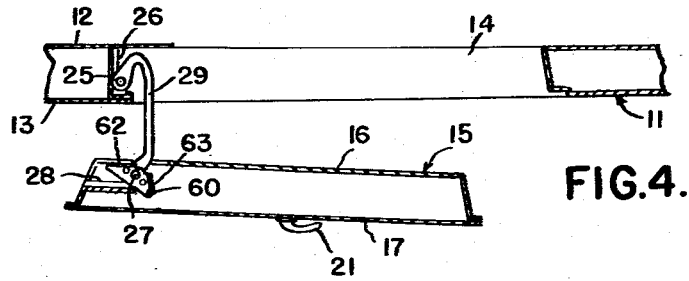
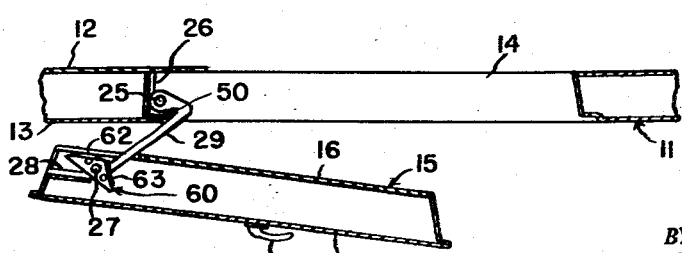
INVENTOR.
JOHN W. TATTER
BY
Hanke + Hanke
ATTORNEYS

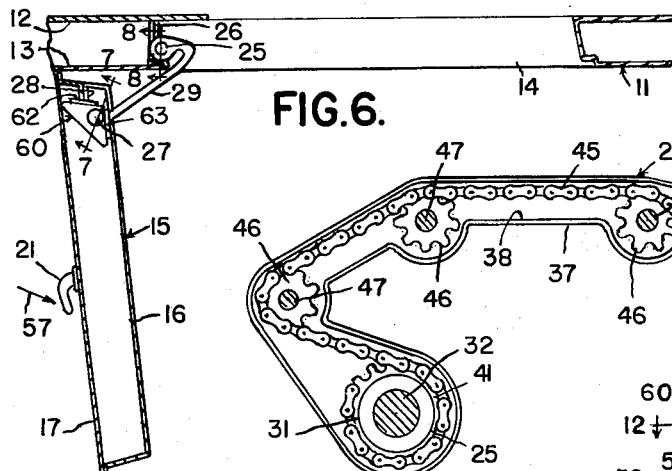
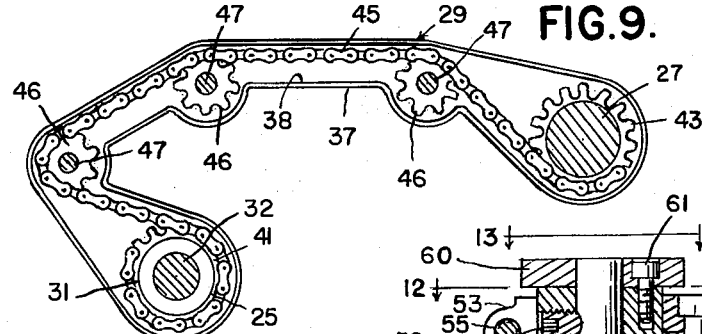
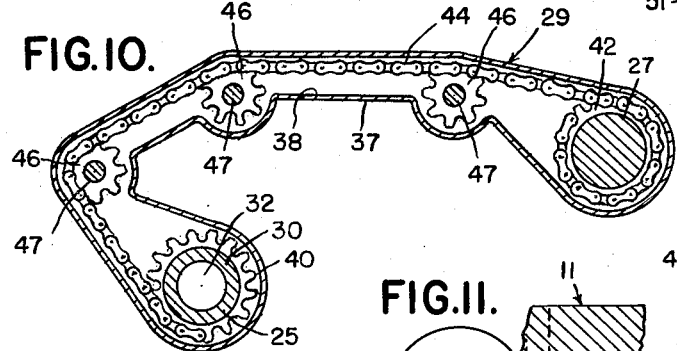
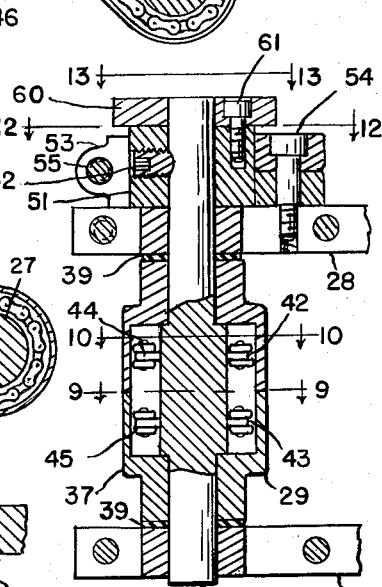
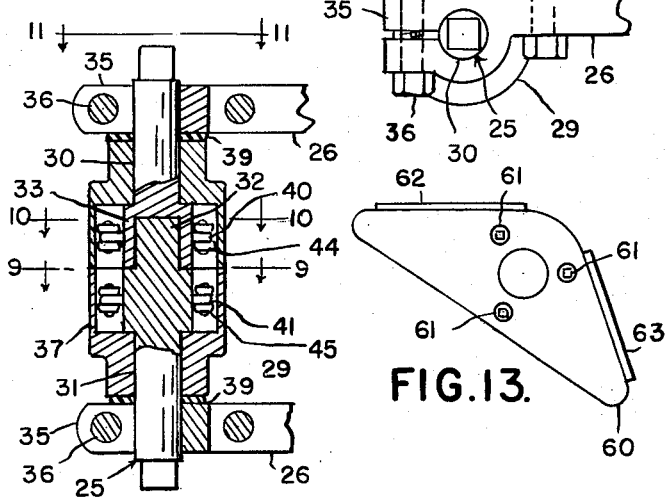
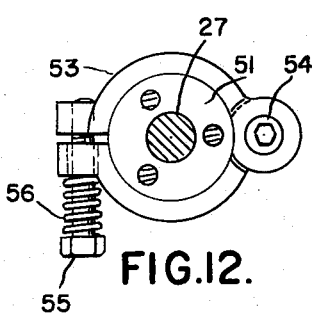

United States Patent Office 3,016,261
Patented Jan. 9, 1962

3,016,261
VEHICLE DOORS
John W. Tatter, 462 Barr Court, Akron 9, Ohio, assignor, by decree of distribution, to Marie W. Tatter and John Wilbur Tatter in equal proportions
Filed Sept. 16, 1959, Ser. No. 840,378
6 Claims. (Cl. 296—46)

This invention relates to vehicle doors and more particularly to a door applicable for use in motor cars and which may be moved out and forward substantially parallel with respect to the vehicle body to facilitate opening the door in a space restricted due to adjacent obstruction and to provide easier access to enter or leave both the front and rear seat of a two-door motor vehicle.

Manufacturers of vehicles and particularly motor cars are confronted with several problems when it comes to the functioning of doors. Obviously, a wider door than heretofore utilized will provide easier access to the interior, and especially to the rear seat of a two-door type motor car. However, wider doors require greater space adjacent the vehicle for opening due to the expanded arc through which the door must swing, and for practical purposes certain limits are reached in considering conventional types of doors.

An object of this invention is to improve the vehicle construction by providing a wider door adapted to be located two to four inches rearward of conventional doors and which can be pivoted outward and forward substantially parallel to the vehicle body to permit easy access to the vehicle, particularly to the rear seat of a two-door vehicle.

A further object of the invention is to provide an improved vehicle door by constructing a novel double acting door hinge that will guide the door out and forward substantially parallel with respect to the vehicle body, and when space permits, the door may yet be swung open in a wide arc to facilitate passage of a large box or other article through the door opening.

According to the present invention, there is provided in a vehicle the combination of a body structure, a door structure and a hinge member hinged to the body and to the door on separate hinge axes, with means inside the double acting hinge for guiding the door outward and forward substantially parallel to the vehicle body, and friction means permitting the door to swing wide open when desired.

For a more complete understanding of the invention, reference may be had to the accompanying drawings illustrating a preferred embodiment of the invention in which like reference characters refer to like parts throughout the several views and in which FIG. 1 is a fragmentary side elevational view of a vehicle having a door constructed in accordance with the present invention.

FIGS. 2, 3, 4, 5 and 6 are cross-sectional views showing the door in various positions as taken on the line 2—3—4—5—6 of FIG. 1.

FIG. 7 is a cross sectional view of one hinge pivot portion taken substantially on the line 7—7 of FIG. 6.

FIG. 8 is a cross-sectional view of a second hinge pivot portion taken substantially on the line 8—8 of FIG. 6.

FIG. 9 is a longitudinal cross-sectional view of the entire hinge assembly as seen when taken along the lines 9—9 of FIGS. 7 and 8.

FIG. 10 is a longitudinal cross-sectional view of the entire hinge assembly as seen when taken along the lines 10—10 of FIGS. 7 and 8.

FIG. 11 is an axial end view of the hinge pivot portion as seen from the line 11—11 of FIG. 8.

FIG. 12 is an axial end view of a friction device on the hinge pivot portion as seen from the line 12—12 of FIG. 7, and FIG. 13 is a top view of a stop element as seen substantially from the line 13—13 of FIG. 7.

In FIGS. 1 through 6, a vehicle 10 is illustrated as comprising a body structure 11 having inner and outer panels 12 and 13 respectively, provided with a door opening 14, and a door structure 15 having inner and outer panels 16 and 17 respectively. For purposes of discussion, FIG. 1 also illustrates approximately the conventional positions of front and rear seats in the vehicle by dotted lines 18 and 19 and approximately the position of conventional door by the dot-dash lines 20. The front edge of the present door 15 is thus illustrated as being preferably disposed about two to four inches rearward of the front edge of the conventional door 20. The present door 15 is also preferably intended to be wider than the conventional door 20 to provide maximum access to the rear seat 19 of the two door vehicle 10. The door 15 has an outer handle 21 disposed substantially centrally between the forward and rear edges of the door 15 for reasons which will be apparent. The conventional door 20 normally has its handle positioned as at 22.

The body structure 11 has hinge pins 25 carried by brackets 26 near the forward edge of the door opening 14. The door structure 15 has hinge pins 27 carried by brackets 28 near the forward edge of the door. Hinge structures 29 are carried by the hinge pins 25 and 27 and each hinge structure 29 carries mechanism, to be described, which normally retains the door 15 in substantially parallel relationship relative to the door opening, but not precisely parallel, as is seen by reference to FIGS. 2 through 5 which illustrate the door in various positions. The side of the door 15 remote from the hinged side is moved laterally outward in a slight arc so that, when the hinge structure 29 swings past 90 degrees of arc and tends to draw the door 15 inward toward the body structure 11, the side remote from the hinge will be a lateral distance from the door opening 14 approximately equal to the furthest lateral distance that the hinged side can take from the door opening 14. Thus, as shown in FIG. 5, when the door structure 15 is swung outward and forward to its fullest extent, a maximum opening is provided from the rear of the door to the rear of the door opening, giving relatively wide access to the vehicle when the lateral space beside the vehicle is restricted by an obstruction such as an adjacent vehicle in a parking lot.

The normal initial motion of the door, being directed laterally outward as shown in FIGS. 2 through 5, accounts for the door handle 21 being centrally located, so that undue torque will not be exerted on the hinge pins 25 and 27 which are interconnected as illustrated in FIGS. 9 and 10.

In FIG. 8, the hinge pin 25 is illustrated as comprising a stepped upper portion 30 and a stepped lower portion 31 axially aligned by means of male and female ends 32 and 33, and rotatable with respect to each other. Each portion is secured by one of the brackets 26 to the body structure 11 as shown in FIG. 11. Each bracket 26 preferably has a split clamp type end 35 and is clamped to the hinge pin 25 by any means such as a bolt 36 to prevent rotation of the hinge pin with respect to the body 11. The outer ends of the hinge pin portions 30 and 31 are preferably squared off as indicated to permit application of a wrench to make adjustments of the hinge pin 25 as needed.

The hinge pin 27 is illustrated in FIG. 7 as comprising a single pin element pivotally carried by the brackets 28 which are somewhat like the previously described brackets 26 except, as shown, they are not split and consequently do not clamp on the pin 27.

The hinge structure 29 comprises a casing 37 split longitudinally and having a chamber 38. The ends of the casing 37 are carried as shown in FIGS. 7 and 8 on the hinge pins 27 and 25 respectively, being disposed at one end between the brackets 26 and at the other end between the brackets 28. Friction washers 39 are preferably provided as shown to effect a degree of resistance to the pivoting of the hinge structure 29 on the hinge pins 25 and 27.

Upper and lower sprockets 40 and 41 respectively are secured to the hinge pin portions 30 and 31 as shown in FIG. 8, and upper and lower sprockets 42 and 43 respectively are secured to the hinge pin 27 as shown in FIG. 7. A chain 44 in the hinge casing chamber 38 connects the upper sprockets 40 and 42 as shown in FIG. 10, while a similar chain 45 connects the lower sprockets 41 and 43 as shown in FIG. 9. Pairs of intermediate idler sprockets 46 are carried in the casing chamber 38 as shown in FIGS. 9 and 10, rotatably mounted on pins 47 and engaged with the chains 44 and 45. The ends of the chains 44 and 45 are welded, soldered, or otherwise secured to the respective sprockets and are oppositely wound as shown.

In operation, as the door is moved toward the open position, the upper chain 44 winds onto the body hinge pin sprocket 40 and unwinds from the door hinge pin sprocket 42, while the lower chain 45 unwinds from the body hinge pin sprocket 41 and winds onto the door hinge pin sprocket 43. In effect, the chains 44 and 45 prevent the door hinge pin 27 from rotating relative to the body hinge pin 25, thus retaining the door 15 in the previously described substantially parallel relationship with respect to the door opening 14. The slight deviation from the parallel which was previously described is provided for by making the door hinge pin sprockets 42 and 43 slightly larger than the body hinge pin sprockets 40 and 41.

Comparing FIGS. 1 and 5, it will be noted that the hinge structure 29 pivots on the body hinge pin 25 approximately 135 degrees, or at least more than 90 degrees but less than 180 degrees, to give the door a forward as well as a lateral shift. The chains 44 and 45 will therefore readily wind on the respective sprockets but will not overlap.

In order to adjust the door to close properly, the bolts 36 of the brackets 26 are loosened when the door is in closed position. Then the hinge pin portions 30 and 31 are rotated oppositely as required in the directions necessary to tighten the chains attached to the respective pin portions 30 and 31. The bolts 36 are again tightened, and thereafter the chains will act to maintain the above described parallel position of the door so that it will always move into the same closing position.

When the door has reached the position of FIG. 5, the hinge structure 29 is prevented from further outward movement by any means such as a stop 50 mounted on the body structure 11. Additional force applied to the door structure 15 will pivot same on the hinge pin 27 to the position shown in FIG. 6. To permit this function, a friction device is utilized as shown in FIGS. 7 and 12, in which the hinge pin 27 is provided with a collar 51 secured to the upper end by any means such as a set screw 52. Around this collar 51 is disposed a two part clamp 53, the two parts being hinged together and secured to the bracket 28 by means of a screw 54. An adjustable bolt 55 holds the other sides of the clamp parts together and the degree of friction between the clamp 53 and the collar 51 is determined by the compression applied to a spring 56 on adjusting the bolt 55. When this friction is overcome, the door 15, mounted on the brackets 28, will pivot on the hinge pin 27 and swing to the position shown in FIG. 6. In closing the door, forces applied are in substantially the direction shown by the arrow 57 in FIG. 6, and will act to swing the door to the position of FIG. 5 with respect to the hinge structure 29 before the hinge structure pivots completely on the hinge pin 25 to the position of FIG. 2, since the hinge structure 29 is now in a more overcenter position and pressure on the hinge structure is initially at a small angle with respect to a line through the hinge pins.

As stop plates 60, shown in FIG. 13, is secured to the collar 51 by any means such as screws 61, and as seen in FIGS. 1 through 6 acts to limit the swinging motion of the door on the hinge pin 27, the stop plate having two stop surfaces 62 and 63 which, at the limits of travel, abut against any properly disposed door structure such as the inner panel 16.

Although I have described only one preferred embodiment of my invention, it will be apparent to one skilled in the art to which the invention pertains that various changes and modifications may be made therein without departing from the spirit of the invention or the scope of the appended claims.

I claim:

1. In a vehicle, a body structure having a door opening and a hinge pin secured near one side of said opening, a door structure dimensioned to fit said opening and having a hinge pin secured near one side, a hinge structure rotatably mounted on both of said hinge pins, said hinge structure having means operably connected with both of said hinge pins and operable on opening said door to substantially prevent relative rotation of said hinge pins on their axes with respect to each other, whereby said door structure is retained in a substantially parallel relationship to the plane of said door opening upon opening of said door, said hinge structure comprising a hollow casing and in which said means connecting said hinge pins comprises a pair of flexible connecting elements wound at the end on said hinge pins and extending through said hollow casing, one element being operable on opening said door to wind up on one hinge pin and unwind from the other hinge pin, the other element being simultaneously operable to unwind from said one hinge pin and wind up on said other hinge pin.

2. The vehicle defined in claim 1 and in which one of said hinge pins comprises two axially aligned portions, each of said connecting elements being respectively connected to each of said pin portions, and means separately rotatably adjusting said pin elements to adjust said connecting elements.

3. The vehicle as defined in claim 1 and in which said connecting elements are wound on the door structure hinge pin on a diameter slightly larger than the diameter of winding on the body structure hinge pin whereby said door on being opened will at the same time move in a small arc outwardly, whereby the side of the door remote from the hinge axis separates from said opening by a slightly greater distance than does the hinged side of said door.

4. The vehicle as defined in claim 1 and in which a pair of axially spaced sprockets are carried on each hinge pin and in which said flexible connecting elements each comprise a chain secured at opposite ends to a sprocket of each hinge pin.

5. The vehicle as defined in claim 4 and in which idler sprockets are rotatably carried in said hinge structure casing and are engaged with said chain.

6. In a vehicle, a body structure having a door opening and a hinge pin secured near one side of said opening, a door structure dimensioned to fit said opening and having a hinge pin secured near one side, a hinge structure rotatably mounted on both of said hinge pins, said hinge structure having means operably connected with both of said hinge pins and operable on opening said door to substantially prevent relative rotation of said hinge pins on their own axes with respect to each other whereby said door structure is retained in a substantially parallel relationship to the plane of said door opening upon opening of said door, said door being rotatable with respect to the hinge pin secured thereto, and said door having a friction device frictionally engaging the hinge pin secured to the door and normally preventing said relative rotation until force sufficient to overcome said friction device is applied to swing said door in an arc from said parallel relationship, a stop plate fixed to the hinge pin secured to said door, and said door having stop elements disposed to engage said stop plate and limit the arc through which said door can be swung.

References Cited in the file of this patent

UNITED STATES PATENTS

| | | |
|---|---|---|
| 1,122,509 | Landine | Dec. 29, 1914 |
| 1,808,180 | Schroeder | June 2, 1931 |
| 2,743,773 | Weiertz | May 1, 1956 |
| 2,923,429 | Schneider | Feb. 2, 1960 |

FOREIGN PATENTS

| | | |
|---|---|---|
| 517,727 | Canada | Oct. 25, 1955 |
| 902,978 | Germany | Feb. 1, 1954 |